United States Patent [19]

Sato et al.

[11] Patent Number: 4,720,726
[45] Date of Patent: Jan. 19, 1988

[54] SHUTTER DRIVING APPARATUS

[75] Inventors: Shigeo Sato; Yutaka Yoshida, both of Tokyo, Japan

[73] Assignee: Fuji Photo Film Co., Ltd., Kanagawa, Japan

[21] Appl. No.: 924,166

[22] Filed: Oct. 28, 1986

[30] Foreign Application Priority Data

Oct. 28, 1985 [JP] Japan ................................ 60-239569

[51] Int. Cl.$^4$ ............................. G03B 7/00; H02P 8/00
[52] U.S. Cl. .................................... 354/439; 318/696
[58] Field of Search ............... 354/435, 436, 437, 439, 354/452, 230, 234.1, 235.1, 456, 458; 318/685, 696

[56] References Cited

U.S. PATENT DOCUMENTS 4,648,701 3/1987 Ogihara et al. ..................... 354/439

Primary Examiner—W. B. Perkey
Attorney, Agent, or Firm—Young & Thompson

[57] ABSTRACT

A shutter driving apparatus drives a programmed shutter with a stepping motor, by using a driving current pulse whose waveform has a leading half that gradually increases in amplitude and a trailing half having an amplitude smaller than the peak value of the pulse. At each rotary stage of the stepping motor, a smooth starting operation can be ensured without any adverse inertial effect at the start or end of rotation, the stepping motor being temporarily driven at low speed at the end of each pulse. In the case of an aperture priority exposure control using a programmed shutter, disadvantageous ripple motion of the shutter sectors is eliminated, thus enabling high precision exposure control.

4 Claims, 9 Drawing Figures

SHUTTER DRIVING APPARATUS

BACKGROUND OF THE INVENTION

The present invention relates to an improved shutter driving apparatus which uses a stepping motor to open and close shutter sectors.

Recent compact cameras are usually equipped with a shutter which uses a stepping motor to open and close the shutter sectors. As described in Japanese Laid-open Patent Publ. No. 60-57327, for example, an exposure program using a stepping motor is advantageous in that a high precision exposure can be effected under digital control and a shutter charging mechanism can be omitted.

If a flash unit is used in daylight, or if the depth of focus is widened, it is desirable to control the exposure to provide a small aperture diameter. Such exposure control may be effected by the exposure program using a stepping motor, by changing the electric driving mode of the stepping motor. In particular, the stepping motor is temporarily stopped when the shutter sectors have reached a position corresponding to a desired aperture size, and after passage of a certain time interval for exposure of the film, the stepping motor is rotated in a reverse direction to close the shutter sectors.

During exposure control at a desired aperture diameter, however, a so-called ripple motion of the shutter sectors often occurs. This ripple motion of the shutter sectors occurs when the stepping motor is stopped following high speed rotation. Specifically, inertia of the rotor of the stepping motor, inertia of a mechanism coupling the motion of the rotor to the shutter sectors and other associated inertia causes the rotor of the stepping motor to surpass, or overshoot the desired stop position, whereupon the stepping motor undergoes an attenuating motion to correct the shutter blades to the desired stop position.

This ripple motion of the sectors can occur during a so-called triangular exposure wherein the shutter sectors are closed prior to their being driven to a maximum open position. In this case, however, the stepping motor is rotated immediately thereafter in a reverse direction to close the sectors; also, during opening of the sectors to the maximum desired open position, a stopper limits the extent of opening of the sectors. Therefore, ripple motion during a triangular exposure is not a substantial problem. However, in exposure control at small diameter apertures, for example, in aperture priority exposure control, the sectors are usually stopped before reaching their maximum desired open position and held in place for a predetermined time. In this case, ripple motion of the sectors is therefore significant, and a large exposure error results.

SUMMARY OF THE INVENTION

The present invention has an object to provide a shutter driving apparatus using a stepping motor to open and close the shutter sectors and capable of eliminating ripple motion of the sectors, thereby to obtain precise and correct exposure control.

To achieve the above object, the waveform of the driving current of a stepping motor is shaped in a form suitable for stopping the stepping motor instantaneously. To this end, according to the present invention, the driving current waveform is shaped such that it has a leading half portion gradually increasing in amplitude and a trailing half portion whose amplitude is smaller than the peak value of the leading half portion. The leading half portion may be a curved waveform or a linear waveform.

Further objects and advantages of the present invention will be apparent from the detailed description of the preferred embodiment presented below.

BRIEF DESCRIPTION OF THE DRAWINGS

The invention wlil now be described in more detail, by way of certain preferred embodiments, with reference to the accompanying drawings, in which.

DETAILED DESCRIPTION OF THE INVENTION

Figure 6:
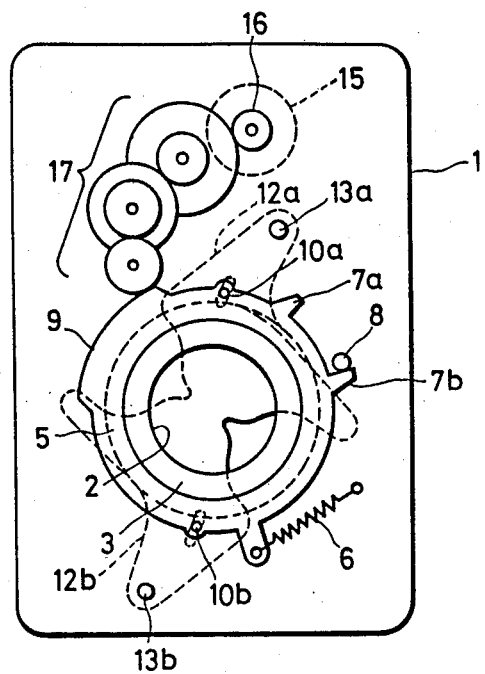
FIG. 6 is a front view showing the construction of a shutter suitable for use with the present invention.

Referring now to FIG. 6, which shows the construction of a shutter used with the present invention, a shutter base plate 1 is formed with an exposure aperture 2 about which a collar 3 is fixedly mounted. A driving ring 5 is rotatably mounted on the periphery of collar 3. The driving ring 5 is urged counterclockwise by a spring 6, which thus holds it in place at an initial position. The range of rotation is deliminated by radial projections 7a and 7b and cooperating with a stop pin 8 mounted on the shutter base plate 1. A gear 9 is integrally formed on a peripheral portion of the driving ring 5, and two shutter sector drive pins 10a and 10b are mounted on the driving ring 5.

On the back of the shutter base plate 1, shutter sectors 12a and 12b are rotatably mounted on pins 13a and 13b, respectively. The sector drive pins 10a and 10b pass through the shutter base plate 1 and are engaged in slots formed in the sectors 12a and 12b, respectively. To simplify the drawing, the holes in base plate 1 through which the sector driving pins 10a and 10b pass, are not shown.

A stepping motor 15 is mounted on the back of shutter base plate 1. The driving ring 5 is driven by the stepping motor 15 via a motor gear 16, a gear train 17 and a gear 9. Specifically, driving pulses whose number has been determined by an exposure control circuit are supplied to the stepping motor 15 to rotate it, and thus to rotate the driving ring 5 counterclockwise to a desired angular position. Thereafter, the stepping motor 15 is rotated in a reverse direction to return the driving ring 5 to its initial position. As the driving ring 5 is rotated, the sectors 12a and 12b are opened or closed to an angular position corresponding to the rotation of the driving ring 5. As the sectors 12a and 12b are opened or closed, the aperture 2 is opened or closed correspondingly, thereby to expose a film positioned at the back of the shutter base plate 1.

Figure 7:
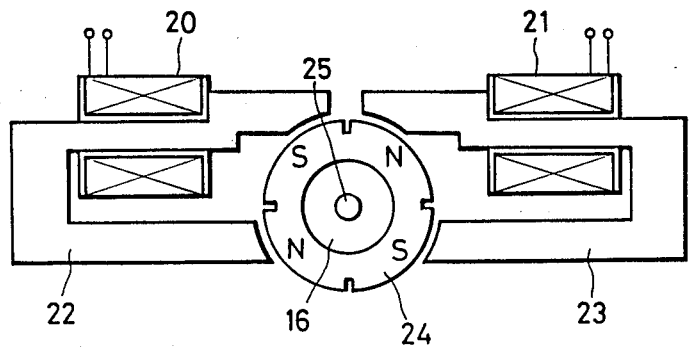
FIG. 7 is a schematic view illustrating the operating prnciple of a stepping motor.

The stepping motor 15 has a basic construction as shown in FIG. 7. Driving current pulses shifted in phase by a half cycle are supplied to coils 20 and 21 alternately to energize the stators 22 and 23, so that magnetic poles of opposite polarity are generated on facing ends of the stators 22 and 23. Between the stators 22 and 23, a magnetic rotor 24 is rotatably mounted, which has a plurality of alternately disposed magnetic poles N and S. The magnetic rotor 24 is rotated to an angular position corresponding to the number of driving current pulses supplied to the coils 20 and 21. The direction of rotation of the rotor 24 is determined by the phase shift direction of the driving currents, which are shifted in phase by ¼ period and supplied to the coils 20 and 21. Since the motor gear 16 is fixed to the rotary shaft 25 of the magnetic rotor 24, rotation of the driving ring 5 and hence the aperture size defined by the sectors 12a and 12b are controlled by the driving current pulses supplied to the coils 20 and 21.

Figure 3:
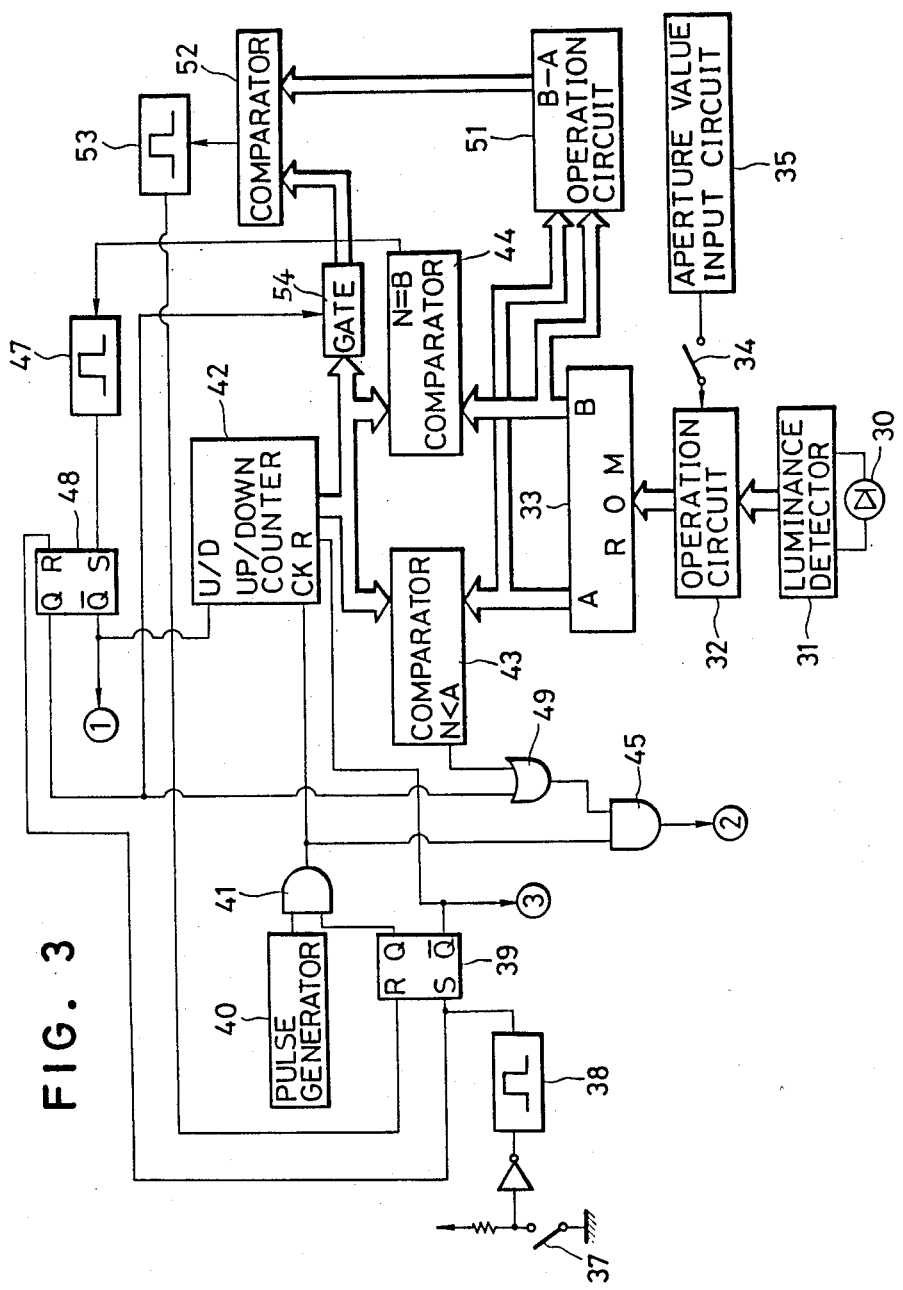
FIG. 3 is a block diagram showing an example of an exposure control circuit.

An exposure control circuit used in the present invention is constructed, for example, as shown in FIG. 3. An object luminance measured by a light receiving element 30 is subjected to a logarithmic process by a luminance detector 31 and thereafter input as an electric analog signal to an operation circuit 32. The operation circuit 32 then converts the analog signal into a digital signal and inputs it to ROM 33. Responsive to this input signal, ROM 33 establishes digital values including an aperture value and a shutter speed value, under the control of a predetermined program. In the case of an ordinary exposure program, that is, when a contact 34 is open, exposure control is effected based on a shutter speed B, as is well known in the art.

In the case of aperture priority exposure control, the contact 34 is closed so that aperture information from an aperture setting ring or the like is input to the operation circuit 32 via an aperture value input circuit 35. The inputted aperture information takes priority at the operation circuit 32. ROM 33 establishes an aperture size value A corresponding to the aperture information received from the aperture value input circuit 35, and establishes a shutter speed value B corresponding to the aperture size value A. When a proper exposure would not be obtained by the inputted aperture information in conjunction with the object luminance, the aperture information is overruled, and a new aperture value and shutter speed value are established in accordance with the predetermined program.

A contact 37 is closed responsive to depression of a shutter button, and a pulse signal is thereby input to a flip-flop (hereinafter called FF) 39 via a one-shot multi-vibrator 38. The Q terminal of FF 39 outputs high level signal (hereinafter called H signal), and a pulse train from a pulse generator 40 is therefore supplied to an up-down counter 42 via AND gate 41.

A pulse number value N is counted up by the up-down counter 42, and this value N is compared with the aperture size value A and the shutter speed value B, respectively by an aperture control comparator 43 and a shutter speed control comparator 44. The count of the up-down counter 42 is "0" initially, so that N is smaller than A and one input terminal of the AND gate 45 is therefore receiving H signal. A pulse train from the pulse generator 40 is thus delivered directly to an output terminal (2) of the AND gate 45.

Figure 4:
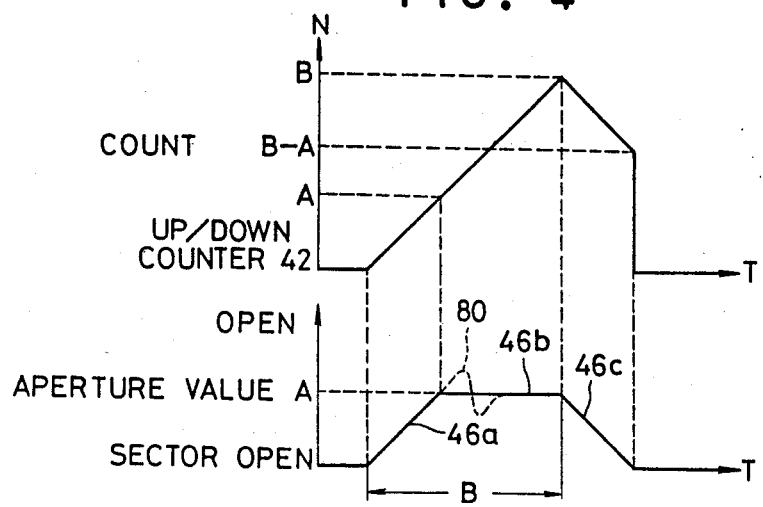
FIG. 4 is a graph showing aperture priority exposure control.

The pulse train is counted by the up-down counter 42 as shown in FIG. 4., and this train is also supplied to a driving circuit, to be described later, of the stepping motor 15 to drive the same. As the stepping motor 15 is driven, the sectors 12a and 12b begin to open, as represented by the straight line section 46a of FIG. 4. The extent of opening of the sectors 12a and 12b and the count N of the up-down counter 42 have a pre-established relationship. When the aperture size defined by the sectors 12a and 12b reaches the aperture value A, i.e., when N=A, then that terminal of AND gate 45 associated with comparator 43 receives low level signal (hereinafter called L signal). Therefore, driving pulses are no longer supplied to the stepping motor 15, and the stepping motor 15 stops.

When the stepping motor 15 stops, the sectors 12a and 12b also stop, at the position corresponding to the aperture value A. Since the up-down counter 42 continues to count up pulses, the sectors 12a and 12b assume the state represented by the straight line section 46b of FIG. 4, that is, they are held in place at the position defining the aperture value A. When the count N becomes equal to the value B established by ROM 33, FF 48 is triggered by a signal emitted by the comparator 44 via a one-shot multi-vibrator 47. Then, the U/D terminal of the up-down counter 42 receives L signal from the $\overline{Q}$ terminal of FF 48, so that the up-down counter 42 starts to count down. The up-down counter 42 counts up while H signal is received at the U/D terminal, whereas it counts down upon receipt of L signal at this terminal.

When FF 48 is triggered and its Q terminal outputs H signal, the associated terminal of AND gate 45 again receives H signal, via an OR gate 49. Therefore, when the comparator 44 recognizes the condition N=B, the stepping motor 15 is again supplied with pulses. In this case, the rotational direction of the stepping motor 15 is reversed by a signal from the terminal (1) that is generated when the U/D terminal of the up-down counter 42 receives L signal. Thus, once N=B, the stepping motor is rotated in a reverse direction by pulses from the terminal (2). As a result, the sectors 12a and 12b are closed, as represented by the straight line section 46c of FIG. 4.

Based on the digital values A and B established in ROM 33, an operation circuit 51 outputs a value "B−A" to a comparator 52. The comparator 52 compares the inputted value of "B−A" with the down-count of the up-down counter 42 and when the down-count equals "B−A", a one-shot multi-vibrator 53 is actuated. A gate 54 is connected between the up-down counter 42 and the compartor 52 such that the comparator 52 is not enabled while the up-down counter 42 counts up. If the value "B−A" is negative, it means that the inputted aperture information cannot yield a proper exposure. This negative value can be used for displaying an alarm.

When the comparator 52 detects that the down-count equals "B−A", the sectors 12a and 12b are at their initial position, the aperture 2 is closed, and the exposure operation is complete. Upon actuation of the one-shot multi-vibrator 53 as described above, FF 39 is reset to output L signal at its $\overline{Q}$ terminal. Therefore, the pulse train from the pulse generator 40 is no longer output by the AND gate 41 and hence no longer by the terminal (2), so that the stepping motor 15 stops. At the same time, an H signal output by the Q terminal of FF 39 is input to the reset terminal of the up-down counter 42 to restore the count to "0". The $\bar{Q}$ terminal output of FF 39 is also supplied to the reset terminal of a ring counter 60 (see FIG. 1) via the terminal (3). Thus, a shutter driving operation is complete. The exposure time is slightly longer than the established shutter sped value B, due to the straight line section 46b, bu the difference proves negligible in practice. It is apparent that this time difference could be taken into account when establishing the shutter speed value B.

Figure 1:
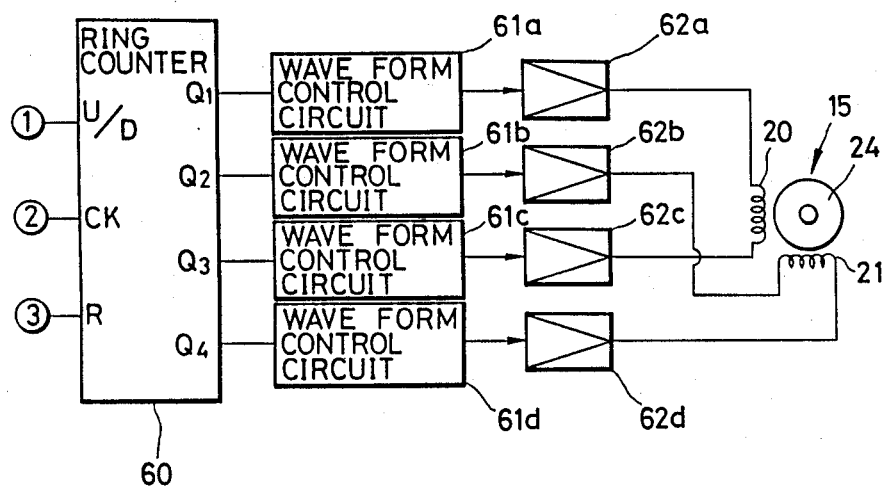
FIG. 1 is a block diagram showing an embodiment of the present invention.
Figure 5:
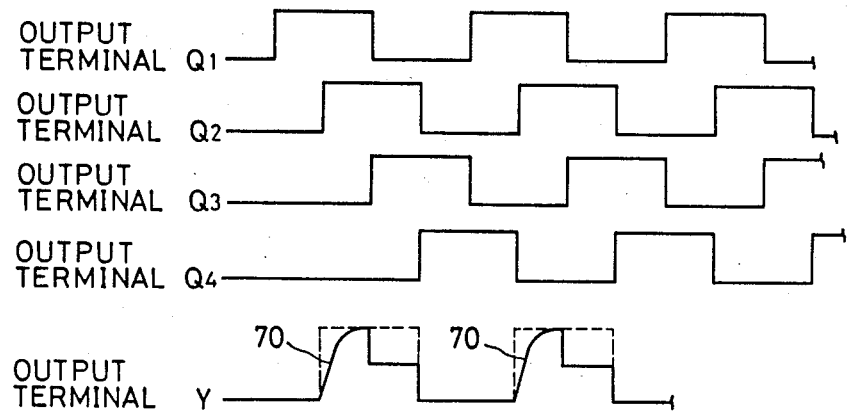
FIG. 5 is a timing chart showing signal waveforms for driving a stepping motor.

The stepping motor 15, which opens or closes the sectors 12a and 12b, is driven by a driving circuit as shown in FIG. 1. Terminals (1), (2) and (3) in FIG. 1 correspond to those so referenced in FIG. 3. The terminals (1), (2) and (3) are the U/D terminal, clock input terminal and reset terminal, respectively, of the ring counter 60. As is well known in the art, the ring counter 60 receives pulses at its clock terminal and sequentially shifts the outputs at terminals Q1 to Q4, the output at the terminal Q4 being shifted back to the terminal Q1. Each time a pulse is input to the clock terminal CK of the ring counter 60, rectangular signals as shown in FIG. 5 are output by the respective terminals Q1 to Q4. The outputs at terminals Q1 and Q3, and those at terminal Q2 and Q4 are respectively opposite in phase. The phases of the outputs at the terminals Q1 and W2 are offset by ¼ period.

The shift direction of the rectangular signals at the temrinals Q1 to Q4 is changed responsive to the input signal at the U/D terminal. Specifically, the outputs shift in the direction from terminal Q1 to Q2 during receipt of H signal at the U/D terminal, thereby to rotate the magnetic rotor 24 of the stepping motor 14 in a first direction, whereas the outputs shift in the direction from terminal Q4 to Q3 during receipt of L signal at the U/D terminal, thereby to rotate the magnetic rotor 24 of the stepping motor 15 in a second direction opposite the first.

Rectangular driving signals output by the respective terminals Q1 to Q4 pass through corresponding waveform control circuits 61a to 61d and are supplied to the excitation coils 20 and 21 of the stepping motor 15 via amplifiers 62a to 62d. Each of the waveform control circuits 61a to 61d is constructed as shown in FIG. 2, wherein X represents an input terminal and Y represents an output terminal of the circuit.

Figure 2:
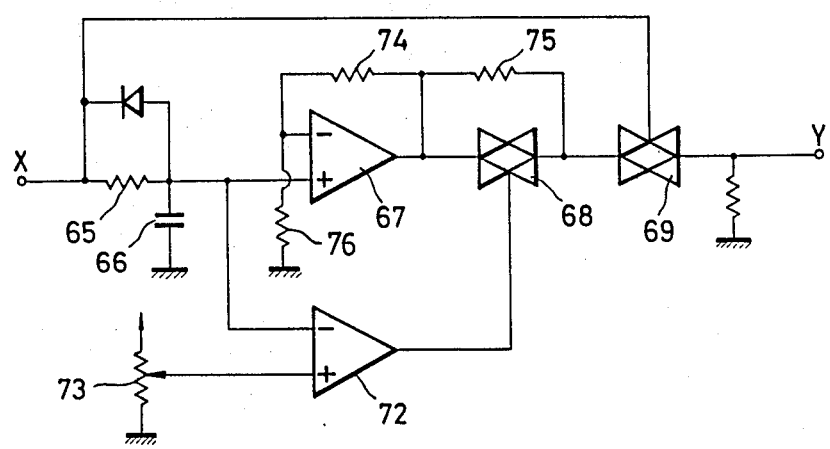
FIG. 2 is a circuit diagram showing an example of a waveform control circuit used in the invention.

Referring now to FIG. 2, a rectangular signal input to the input terminal X is integrated by an integrator comprising a resistor 65 and a capacitor 66, and passes through an operational amplifier 67 and analog switches 68 and 69 to generate an integrated signal 70 at the output terminal Y. In FIG. 5, the waveform shown by a broken line is a waveform of a rectangular signal input to the input terminal X. The slope of the integrated signal, shown in solid line, can be changed as desired by appropriately selecting the values of the resistor 65 and the capacitor 66.

The level of the integrated signal is checked by an operational amplifier 72. When the level reaches a reference level as established by a variable resistor 73, the analog switch 68 turns off. The reference level is set at a level obtained when the capacitor 66 is completely charged. When the analog switch 68 turns off, that output of the operational amplifier 67 occurring between resistors 74 and 76 is delivered to the output terminal Y via a resistor 75. This output has an amplitude equal to one half the peak value of the integrated signal 70, as shown in FIG. 5. When a rectangular signal is no longer input to the input terminal X, the analog switch 69 turns off so that a driving current pulse having a waveform as shown in FIG. 5 can thus be obtained.

The above waveform control is carried out for each of the outputs of the terminals Q1 to Q4 of the ring counter 60, so that similar driving current pulses are supplied to the coils 20 and 21 of the stepping motor 15.

When the stepping motor 15 is driven by driving current pulses having a waveform as shown at output terminal Y in FIG. 5, since the leading half of the pulse gradually increases in amplitude, the magnetic rotor 24 of the stepping motor 15 is not driven with an abrupt starting torque that would cause an adverse inertial effect. Furthermore, since the trailing half of the pulse has a limited current value, the rotor 24 is driven at lower rotory speed. As a result, when the driving current pulses stop, the magnetic rotor 24 overshoots its programmed stopping position either only negligibly or not at all, so that exposure dispersion due to ripple motion of the sectors 12a and 12b, shown by broken line 80 in FIG. 4, is eliminated. The current level at the trailing half of the driving current pulse, relative to the peak value, may be adjusted as desired by appropriately selecting the values of the resistors 74 and 76. In practicing the present invention, other circuit arrangements may be adopted for the exposure control circuit shown in FIG. 3, the waveform control circuit shown in FIG. 2, etc.

Figure 8:
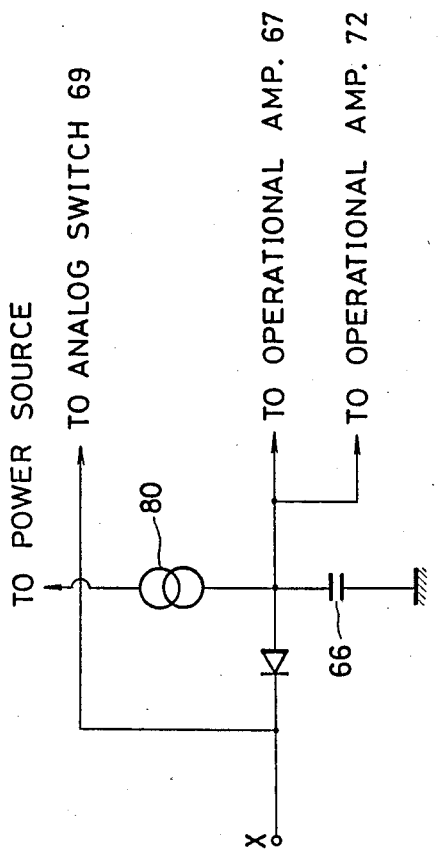
FIG. 8 is a partial circuit diagram of a circuit for obtaining a linear and gradually increasing waveform, the circuit being used in conjunction with the circuit of FIG. 2.
Figure 9:
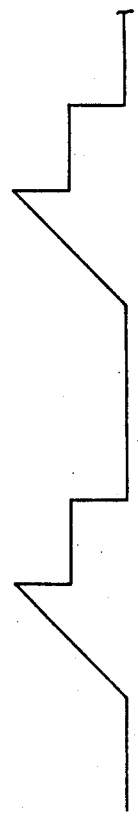
FIG. 9 shows a driving current waveform obtained from the circuit of FIG. 8 used in conjunction with the circuit of FIG. 2.

In the circuit of FIG. 2, the capacitor 66 is charged by current passing through the resistor 65. However, instead of this charging circuit, a charging circuit as shown in FIG. 8 may be used. In the circuit of FIG. 8, a constant current source 80 is used to charge the capacitor 66 with a constant current so that a driving current pulse having a waveform whose leading half increases in amplitude gradually and linearly, can be obtained, as shown in FIG. 9.

As described in the foregoing, in driving a programmed shutter by using a stepping motor, the shutter driving apparatus of the present invention uses a driving current pulse for driving the stepping motor, the waveform of the driving current pulse having a leading half gradually increasing in amplitude and a trailing half having an amplitude less than the peak value of the pulse. Therefore, at each step of rotation of the output shaft of the stepping motor, smooth starting and stopping is assured, without any adverse inertial effect, the stepping motor being temporarily driven at low speed at the end of each pulse. Thus, whenever the driving pulses stop, the rotor is stopped correctly. In case of an aperture priority exposure control using a programmed shutter, the undesired ripple motion of the sectors is eliminated, thus enabling high precision of exposure control.

It will be understood that the present invention is not limited to the embodiments described and shown. Modifications remain possible, particularly from the point of view of equivalent techniques, without departing whatsoever from the spirit and scope of the invention.

What is claimed is:

1. In a camera having a shutter, a stepping motor for opening and closing said shutter, and a pulse generator for supplying a series of pulses to drive said stepping motor; an improvement comprising:
    a waveform shaping circuit disposed in electrical circuit between said pulse generator and said stepping motor, said shaping circuit comprising means shaping each of said series of pulses to form a pulse having a leading half gradually increasing in amplitude to a peak amplitude and a trailing half having an amplitude less than said peak amplitude;

whereby said shutter can be smoothly and precisely stopped at a desired position simply by terminating said supply of pulses to said stepping motor.

2. Camera according to claim 1, wherein said shutter comprises a plurality of cooperating shutter sectors.

3. Camera according to claim 1, and a ring counter disposed in electrical circuit between said pulse generator and said waveform shaping circuit, said ring counter imparting a rectangular waveform to each of said series of pulses.

4. Camera according to claim 1, wherein said waveform shaping circuit comprises first switching means for determining said peak amplitude, and second switching means for determining that an entire said pulse has entered said waveform shaping circuit.

* * * * *